United States Patent [19]

Freeman et al.

[11] 3,880,694
[45] Apr. 29, 1975

[54] METHOD OF BONDING USING RAPID CURING RESIN COMPOSITIONS COMPRISING THE REACTION PRODUCT OF AN ALDEHYDE CONDENSATION POLYMER WITH A PRIMARY AROMATIC AMINE FURTHER REACTED WITH A CURING AGENT

[75] Inventors: Harlan G. Freeman; Gene F. Baxter; George Grahm, all of Seattle, Wash.

[73] Assignee: Weyerhaeuser Company, Tacoma, Wash.

[22] Filed: Oct. 23, 1973

[21] Appl. No.: 408,406

Related U.S. Application Data

[60] Division of Ser. No. 174,942, Aug. 25, 1971, Pat. No. 3,784,515, which is a continuation-in-part of Ser. No. 113,681, Feb. 8, 1971, abandoned, which is a continuation-in-part of Ser. No. 821,996, May 5, 1969, abandoned, which is a continuation-in-part of Ser. No. 639,270, May 18, 1967, Pat. No. 3,518,159.

[52] U.S. Cl. .............. 156/331; 156/335; 161/261; 260/51.5
[51] Int. Cl. ........ C09j 5/00; C08g 9/32; C08g 9/06
[58] Field of Search ................ 156/310, 331, 335; 161/188, 261; 260/51.5

[56] References Cited
UNITED STATES PATENTS

| | | | |
|---|---|---|---|
| 2,475,587 | 7/1949 | Bender et al. | 260/57 R |
| 2,557,826 | 6/1951 | Keaton et al. | 156/310 |
| 2,962,442 | 11/1960 | Andress | 260/53 R X |
| 3,476,706 | 11/1969 | Bornstein | 156/335 X |
| 3,615,975 | 10/1971 | Gillern et al. | 156/79 |
| 3,706,619 | 12/1972 | Freeman | 156/315 |
| 3,714,121 | 1/1973 | Kobel et al. | 260/51.5 |
| 3,784,516 | 1/1974 | Baxter et al. | 260/51.5 |

FOREIGN PATENTS OR APPLICATIONS
615,335  1/1949  United Kingdom

*Primary Examiner*—Daniel J. Fritsch
*Assistant Examiner*—Robert A. Dawson
*Attorney, Agent, or Firm*—Christensen, O'Connor, Garrison & Havelka

[57] ABSTRACT

This invention describes resin products having particular utility as rapid curing adhesives for wood and other materials, and processes for making the resin compositions. The reaction products are made by reacting an aldehyde condensation polymer, such as a phenol-formaldehyde condensation polymer, with a primary aromatic amine having the formula:

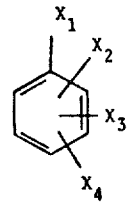

where:

$X_1$ is $-NH_2$
$\quad\quad -CH_2NH_2$ $X_2$ is $-X_1$
$\quad\quad -OH$
$\quad\quad -\text{alkoxy}$ $X_3$ is $-X_1$
$\quad\quad -COOH$
$\quad\quad -NHCOCH_3$
$\quad\quad -NO_2$
$\quad\quad -OH$
$\quad\quad -C_1$ to $C_5$ alkyl
$\quad\quad -H$
$\quad\quad -A-\text{\textlangle O\textrangle}$
$\quad\quad -\text{halogen}$
$\quad\quad -\text{halogenated alkyl}$
$\quad\quad -\text{alkoxy}$ $X_4$ is $C_1$ to $C_4$ alkyl
$\quad\quad -H$
$\quad\quad -\text{aryl}$ and A is

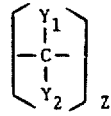

$-SO_2-$
$-NH-$
$-C-$
$-S-$
$-C=C-$
$-S-S-$
$-N=N-$ where $Y_1$ and $Y_2$ are hydrogen or alkyl radicals having from 1 to 3 carbon atoms and Z is an integer from 0 to 2, to obtain an amine-modified polymer. On blending an appropriate hardening agent with the amine-modified polymer, the composition cures very rapidly at ambient temperature. When pieces of wood or other materials are spread with the preferred adhesives employing the resin compositions of this invention and brought into contact with another wood or other surface the bond strength develops within minutes.

27 Claims, No Drawings

METHOD OF BONDING USING RAPID CURING RESIN COMPOSITIONS COMPRISING THE REACTION PRODUCT OF AN ALDEHYDE CONDENSATION POLYMER WITH A PRIMARY AROMATIC AMINE FURTHER REACTED WITH A CURING AGENT

CROSS REFERENCE

This application is a divisional of copending application Ser. No. 174,942, filed Aug. 25, 1971 (now U.S. Pat. No. 3,784,515) which application was a continuation-in-part of earlier copending application Ser. No. 113,681, filed on Feb. 8, 1971 (now abandoned), and entitled "Rapid Curing Resin Compositions Comprising The Reaction Product of an Aldehyde Condensation Polymer With a Primary Aromatic Amine Further Reacted With a Curing Agent." Application Ser. No. 113,681 was a continuation-in-part of earlier copending application Ser. No. 821,996, filed on May 5, 1969, now abandoned, and entitled "Rapid Curing Resin Compositions Comprising the Reaction Product of an Aldehyde Condensation Polymer With a Primary Aromatic Amine Further Reacted With Additional Aldehyde." Application Ser. No. 821,996 was itself a continuation-in-part of application Ser. No. 639,270, filed May 18, 1967, entitled "Method of Making a Fast-Curing Adhesive and a Method of Bonding Members Utilizing Said Adhesives," now U.S. Pat. No. 3,518,159. While this application is directed to certain new methods of preparation of rapid curing resin compositions, to certain resin compositions per se, and to certain use of these resin compositions as adhesives, other methods, compositions and uses for the same purposes are disclosed and claimed in the copending application having a common assignee, Ser. No. 164,927, filed July 21, 1971, (now U.S. Pat. No. 3,773,721) and having a title identical to that of this application.

BACKGROUND OF THE INVENTION

This invention relates to the preparation of rapid curing resin compositions, to the resin compositions per se, and to the use of these resin compositions as adhesives.

For many years the adhesives used to bond wood together to make plywood, laminated beams, furniture, etc., have employed aldehyde condensation polymers of phenol, urea, resorcinol, and other similar compounds. These resins, however, produce adhesives having relatively slow curing rates.

The relatively slow cure rates of these resins have necessitated long press times with concurrent restriction on production when used in the manufacture of laminated beams, plywood and other construction uses. To overcome the slow cure rates many modifications of the above resins have been proposed. Other resins, such as the epoxics, have been proposed, but their expense and certain of their physical properties have limited their use. The resins of this invention employ aldehyde condensation polymers modified with particular amines. These resins not only have rapid cure rates but develop adequate adhesive bond strengths in a short amount of time at ambient temperature, thereby eliminating the need for long press times and application of heat to develop sufficient bond strength.

Mazzucchelli et al, in U.S. Pat. No. 2,557,922, describe the preparation of modified phenol-formaldehyde condensation products by the inclusion of mono-amino diphenyls, diaminodiphenyls, or amino diphenylmethanes alone or as condensation products with formaldehyde. The compositions, when mixed with suitable fillers, are used primarily as electrical insulators.

Edison, in U.S. Pat. No. 1,283,706, teaches that small amounts of p-phenylenediamine may be added to two-stage phenolic molding compound or varnish resins as a catalyst to accelerate the heat cure of these resins. Other patents of which U.S. Pat. Nos. 2,106,486, 2,511,913, 2,582,849, 2,875,160, 2,290,345, and 2,994,669 are exemplary, disclose the use of aromatic amines, especially m-phenylenediamine, in insoluble resins intended as ion exchange materials. It is also well known to make condensation resins from aniline and an aldehyde or to use aniline as a modifier for other condensation resins, as taught by Harvey in U.S. Pat. No. 2,766,218.

Cox et al in U.S. Pat. No. 3,186,969 describe intermediate products which are further reacted with compounds containing the oxirane group to form vicinal epoxides. The intermediate products are reaction products of an aromatic primary amine, a phenol and an aldehyde. Reaction conditions, however, are carefully chosen to avoid any condensation between the phenol and aldehyde.

Bornstein in U.S. Pat. No. 3,471,443 teaches the use of aniline or aniline salts as cure accelerators in heat curing phenolformaldehyde resins and gives the same teaching in regard to phenol-resorcinol-aldehyde resins in U.S. Pat. No. 3,476,706. The latter patent also teaches a so-called honeymoon glue system using the disclosed products.

German Pat. No. 358,195 describes resins made by using phenols having basic groups, such as aminophenols, as alkaline catalysts for the condensation of phenol with formaldehyde. The minor amount of catalyst, up to 3 parts per hundred parts of phenol, is cooked together with the phenol and formaldehyde to produce a product suggested as useful for electrical insulation.

Auer, in U.S. Pat. No. 2,309,088 teaches the manufacture of organic isocolloids through modification of resins with amine compounds. The isocolloids are useful, inter alia, as additives for varnishes to improve their alkali and hot and cold water resistance. Fusible phenolic resins containing a natural resin or resinous esters thereof are modified by Auer by heating with particular amines at elevated temperatures "to insure complete dissolution or dispersion of the modifying agent". It is not clear even to Auer whether any chemical reaction takes place between the phenolic resin and amine. However, if there was a reaction, the substituents such as carboxyl groups on the phenolic resins attributable to the natural resin or resinous esters thereof would result in the formation of amides, and not in the formation of the amine modified products of this invention. Amide modified condensation polymers have significantly lower reactivity for purposes of this invention than do amine modified condensation polymers, and are therefore to be avoided. Further, because Auer's phenolic resin starting materials are apparently permanently fusible, it can be inferred that they are novolaks and therefore contain no reactive alkylol groups, making them inappropriate for the practice of the present invention.

SUMMARY OF THE INVENTION

This invention relates to a process for the preparation of rapid curing resin compositions for use as adhesives, and to the resin compositions themselves, and particularly to the addition of a curing agent to the reaction product of a primary aromatic amine with an aldehyde condensation polymer having reactive alkylol groups. The resins of this invention are prepared by reacting together an aldehyde condensation polymer having reactive alkylol groups, with a primary aromatic amine of the formula:

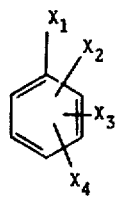

where:

$X_1$ is $-NH_2$, $-CH_2NH_2$ $X_2$ is $-X_1$, $-OH$, $-alkoxy$ $X_3$ is $-X_1$, $-COOH$, $-NHCOCH_3$, $-NO_2$, $-OH$, $-C_1$ to $C_5$ alkyl, $-H$, $-A-$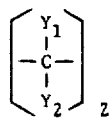, $-halogen$, $-halogenated\ alkyl$, $-alkoxy$ $X_4$ is $C_1$ to $C_4$ alkyl, $-H$, $-aryl$ and A is

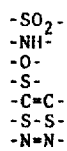

$-SO_2-$
$-NH-$
$-O-$
$-S-$
$-C=C-$
$-S-S-$
$-N=N-$ where $Y_1$ and $Y_2$ are hydrogen or alkyl radicals having from 1 to 3 carbon atoms and Z is an integer from 0 to 2, to produce an amine-modified polymer. This resinous product is then blended with a sufficient amount of curing agent to cause the resin to become infusible. On addition of the curing agent to the amine-modified condensation polymer, the material rapidly sets to an insoluble, infusible condition at ambient temperature. Optionally, heat may be applied to increase cure speed.

The resins can be used to bond wood to wood, metal to metal, wood to metal, fabric, and many other materials where durable, moisture-resistant, heat-resistant adhesive compositions are needed.

DETAILED DESCRIPTION OF THE INVENTION

Many of the aldehyde condensation polymers of phenol, resorcinol, urea, and melamine have been widely used as adhesives and their properties are well known. The aldehyde condensation polymers which can be used in this invention have reactive alkylol groups, and are well known and commercially available. "Polymers," as used herein, means resinous mixtures which do not crystallize nor have a sharp melting point. "Reactive alkylol groups" are alkylol groups capable of reacting with the primary aromatic amines used in this invention to modify the aldehyde condensation polymers. "Condensation" is used herein to mean a polymerization reaction in which a molecule, such as water, is eliminated and is to be distinguished from "addition" in which no by-product is formed. Further, the aldehyde condensation polymers used in this invention exclude those having dominant amide forming substituents.

Three classes of polymers are preferred: phenoplasts, aminoplasts, and ketone-aldehyde condensation polymers. They include such resins as the acid or base catalyzed phenol-aldehyde resins, urea-aldehyde resins, melamine-aldehyde resins, acetone-aldehyde resins, etc. The following references disclose methods of preparing the condensation resins useful in this invention: "The Chemistry of Synthetic Resins" by Carleton Ellis, Reinhold Publishing Co., 1935; "Phenolic Resin Chemistry" by N. J. L. Megson, Academic Press Inc., New York, 1958; "Aminoplasts" by C. P. Vale, Cleaver-Hume Press, Ltd., London, England; and British Pat. No. 480,316.

Specifically, the aldehyde condensation polymers which can be used include (1) phenoplasts comprising the condensation polymers of an aldehyde such as formaldehyde with a phenolic type material having open reactive positions, such as phenol, phenol-resorcinol, xylenol, cresol, resorcinol, and their derivatives, (2) aminoplasts comprising the condensation polymers of an aldehyde such as formaldehyde with compounds such as benzoguanamine, dicyandiamide, urea, melamine-urea, melamine, and their derivatives, and (3) ketone-aldehyde condensation polymers such as acetone-formaldehyde, methyl ethyl ketone formaldehyde, methyl isobutyl ketone formaldehyde, and the like. The preferred resins are water-soluble, liquid, thermosetting phenol-aldehyde resins.

A preferred resin is an ortho-condensed phenolformaldehyde resin made by condensing 0.7 to 1.0 moles formaldehyde with 1 mole phenol in the presence of an ortho-directing catalyst such as calcium acetate. Such resins are known. Each of the aldehyde condensation polymers mentioned above is prepared and kept under conditions which prevent it from condensing to an infusible state by known methods. Although phenol is the preferred reactant the phenolic resins may be modified by incorporating into them predetermined amounts of other monohydric phenols or a dihydric phenol such as resorcinol or other polyhydroxy aromatic compounds.

The aldehyde used in preparation of the condensation polymer may be (1) monofunctional (i.e. a monoaldehyde), or (2) polyfunctional, having at least two aldehyde groups separated by at most one carbon atom, and can be, for instance, formaldehyde, paraformaldehyde, polyoxymethylene, trioxane, acrolein, and aliphatic or cyclic aldehydes such as glyoxal, acetaldehyde, propionaldehyde, butyraldehyde, and furfuraldehyde. Condensation, when using formaldehyde, furfuraldehyde, paraformaldehyde, polyoxymethylene or trioxane, is generally accomplished with the use of a mildly acid, alkaline, or no catalyst. When using acrolein, glyoxal, acetaldehyde, propionaldehyde or butyraldehyde, condensation is generally accomplished by combining the reactants in the presence of a strongly acid catalyst, neutralizing the reaction product, adding more aldehyde, and further reacting in the presence of a mildly acid, or alkaline, catalyst.

The aldehyde condensation polymers mentioned above are modified by reaction with a primary aromatic amine to give an amine-modified polymer. it is necessary, in order to produce the low-temperature fast curing products of this invention, to first produce the aldehyde condensation polymer and then subsequently modify that polymer with the primary aromatic amine. Simultaneous reaction of all the reactants, i.e., phenol, formaldehyde and amine, produces an inferior, heterogeneous mass, i.e., comprising essentially an amine-formaldehyde condensation polymer containing free phenol.

The amount of amine used to react with the condensation polymer may range from about 0.05 to 2.0 parts by weight of the amine to each part of the condensation polymer and preferably 0.1 to 1.0 parts by weight of the amine to each part of the condensation polymer. More than 2.0 parts by weight of the amine to each part of the aldehyde condensation polymer can be used but there is little advantage in doing so. Most of the amines disclosed react with the aldehyde condensation polymers at room temperature, but to insure complete reaction the mixtures are usually heated to reflux. Many of these reactions are exothermic in nature and cooling is required to control the reaction. This exothermic nature of the reaction is in some instances controlled by slow addition of the amine to the prepared polymer. It may be desirable under some circumstances, however, to add the polymer to a solution of the amine. When the resin is ready to be used a curing agent is blended therein.

The amines useful for modifying the aldehyde condensation polymers include primary aromatic amines having the formula:

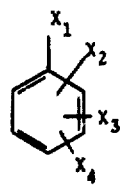

where:

$X_1$ is $-NH_2$    $X_2$ is $-X_1$    $X_3$ is $-X_1$    $X_4$ is $C_1$ to $C_4$
       $-CH_2NH_2$       $-OH$        $-COOH$        alkyl
                         $-alkoxy$    $-NHCOCH_3$    $-H$
                                    $-NO_2$       $-aryl$
                                      $-OH$
                                      $-C_1$ to $C_5$ alkyl
                                      $-H$
                                      $-A-\bigcirc$
                                      $-halogen$
                                      $-halogenated$ alkyl
                                      $-alkoxy$ and A is 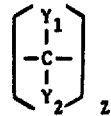

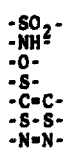

where $Y_1$ and $Y_2$ are hydrogen or alkyl radicals having from 1 to 3 carbon atoms and Z is an integer from 0 to 2.

The following amines are exemplary of those that may be used in the preparation of these resins: 4-aminosalicylic acid; 3,5-diamino benzoic acid; m-hydroxyaniline; o-phenylenediamine; m-phenylenediamine; p-phenylenediamine; 1,2,4-triaminobenzene; 1,3,5-triaminobenzene; m-xylylenediamine; 2-aminoresorcinol; m-methoxyaniline; 2,4,6-triaminotoluene; 2,4-diaminodiphenylamine; 2-amino-5-nitrophenol; 1,3-diamino-4-methoxybenzene; 1,3-diamino-4-nitrobenzene; 1,4-diamino-2-nitrobenzene; 2,4-diaminophenol; 1,3-diamino-4-chloro benzene; 2,4- diaminotoluene; o-hydroxyaniline; and 2,4-diaminoacetanilide. The preferred amines from the standpoint of economics and adhesive properties include m-hydroxyaniline and m-phenylenediamine.

Primary aromatic amines having the basic structures of those suggested above, but further substituted with non-interfering substituents, are also useful in this invention. By "non-interfering substituents" is meant those substituents which do not detract from the usefulness of the primary aromatic amines in this invention. For example, halogen, ether, alkyl, aryl, cyano, sulfide, and mercaptan groups are non-interfering substituents which could be attached to the carbon ring of the suggested primary aromatic amines without reducing their usefulness, i.e., without significantly changing resin shelf life or adhesive cure speed. A primary aromatic amine containing such a non-interfering substituent which would be satisfactory for purposes of this invention is 2-4, diamino toluene.

Also useful for purposes of this invention are the acid salts of the suggested primary aromatic amines which salts are formed by the reaction of such primary aromatic amines with nonoxidizing acids such as the hydrohalide acids, sulphuric acid, phosphoric acid, acetic acid, propionic acid, butyric acid, and the like. These salts are equivalent, for purposes of this invention, to the free primary aromatic amines, and will normally be present in the reaction system when the aldehyde condensation polymer is reacted with the primary aromatic amine under acidic conditions.

The amine-modified aldehyde condensation polymers useful in this invention are generally prepared by reacting the amine compounds described with previously prepared aldehyde condensation polymer, usually under reflux conditions, in the presence of a small amount of water, methanol, water-methanol mixture, or other suitable carrier vehicle. These polymers make up the first component of the resin composition. The first component is prepared so as to have a relatively long storage life so it can be shipped and stored for fairly long periods of time without gelation.

The second component of the resin composition is a curing agent which may be an alkylene donating compound, a di- or poly-isocyanate, or an epoxide, used either alone, in combination with one another, and/or mixed with conventional thickening agents. The curing agent is blended with the amine-modified aldehyde condensation polymer when needed. Other materials that readily donate alkylene bridges to the polymer system are also generally suitable. Reaction takes place at ambient temperature and the blended mixture gels rapidly to an insoluble infusible state. The preferred resins of this invention set to an insoluble infusible state within a few minutes. "Insoluble" is intended to mean not soluble in common solvents such as water, alcohols, ketones, hydrocarbons, esters, glycols, and the like. Optionally, heat may be applied to the curing composition if desired to further decrease the required cure time.

Sufficient curing agent is added to the first component to form an infusible product. The amount of curing agent is not critical and may range from 0.02 to 2.0 parts by weight per part of amine-modified condensation polymer; as stoichiometric proportions are approached and surpassed the completeness of the cure approaches 100%.

The preferred curing agent is an aldehyde such as formaldehyde, though the formaldehyde-forming compounds polyoxymethylene, trioxane and paraformaldehyde are quite satisfactory. Other aldehydes may be also used, for example, aliphatic or cyclic aldehydes having from 1 to 8 carbon atoms such as acrolein, glyoxal, acetaldehyde, propionaldehyde, butyraldehyde, and furfuraldehyde. Phenolic resoles and other similar polymers having free methylol groups are also efficient curing agents. Suitable di-isocyanate curing agents comprise toluene di-isocyanate, phenylene di-isocyanate, 1,6 di-isocyanoto-hexane, and the like, while suitable epoxy curing agents comprise diglycidyl ether of bisphenol A, epoxidized phenolic novolacs, epoxidized polyglycols and the like.

When the first component comprising the amine-modified condensation polymer and the second component comprising the curing agent are mixed together the composition becomes insoluble and infusible in a very short period of time. When bonding materials together the two components are kept separate until they are needed. They are then intimately mixed and spread on the material to be bonded by any conventional means. An automatic mixing-dispensing gun is most useful in this regard.

Certain of the resin compositions of this invention have such rapid cure times that they begin to cure before they can be spread on the material to be bonded. To overcome this problem the first component can be spread on one surface of the material to be bonded and the second component spread on the second surface to be bonded. Such a process is described, for example, in U.S. Pat. Nos. 2,557,826 and 3,476,706 using phenol-resorcinol-formaldehyde resins. When the surfaces are brought into contact the first and second resin components react forming an infusible glue line between the materials.

If desired, other ingredients can be added to the adhesive compositions. Such ingredients include conventional fillers, pigments, plasticizers, and the like, in amounts ordinarily employed for such purposes.

The compositions of this invention do not need additional catalyst or heat to cure them. They are curable at ambient temperatures and in very short time periods after mixing of the two components. Additionally the resin compositions develop bond strengths sufficient to hold articles together in a relatively short amount of time.

The following examples illustrate this invention. Parts and percents where used are intended to be parts and percents by weight, unless otherwise specified.

EXAMPLE 1

This example illustrates the fast cure rates of the resin compositions of this invention. Cure rate was determined by means of "gel" time. Gel time was determined by weighing out a 10 gram aliquot of the first component, adjusting the pH to the desired point, and mixing the second component with the first component. The time elapsed from mixing to gelling of the composition is termed "gel time". In each instance, the compositions were formulated by mixing an amine-modified phenol-formaldehyde polymer with additional formaldehyde.

The phenol-formaldehyde polymer was prepared by mixing 42.06 parts by weight phenol, 4.51 parts water, 11.35 parts flake paraformaldehyde (91%) and 0.46 parts calcium acetate monohydrate. The mixture was brought to reflux (approximately 109°C.) in about 60 minutes at a uniform rate and held at reflux for 120 minutes, thus producing an aldehyde condensation polymer having reactive alkylol groups. To separate 100 gram aliquots of this polymer were added 0.305 moles of each of the respective amines shown in Table 1. The mixture in each case was refluxed for 2.25 hours, cooled, and 26.3 grams of methanol stirred into the mixture. The gel time of each of the adhesive compositions was determined as set forth above. The solution pH has some effect on the gel time of the resins. This pH effect is dependent primarily on the particular amine being used, but also on the solvent used and the concentration of the amine.

Table 1 lists the amines used, the gel time and the pH range over which the gel times were obtained. Though the cure rates of many of the resins are pH dependent, the determination of the optimum pH for a desired gel time can be determined easily by a skilled technician.

Normally wood failure begins to occur at a value of about 150 psi. For many purposes, however, a bond strength well below this value is wholly satisfactory. It should also be noted that strength usually continues to increase significantly for at least a 24-hour period after initial assembly.

EXAMPLE 3

To 100 grams of high solids phenol-formaldehyde polymer, prepared as described in Example 1, was added 0.305 moles of 2,4-diaminoacetanilide. The mixture was refluxed for 2.25 hours, cooled, and 26.3 grams of methanol stirred into the mixture. A 10 gram aliquot of the amine-modified resin was weighed out, and 5.0 grams of an asbestos thickened solution of 55% formaldehyde in methanol and water added. The mixture was stirred rapidly and used in a cross-lap test. At

TABLE I

| Compound | Gel Time | pH Range |
| --- | --- | --- |
| 4-aminosalicylic Acid | Less than 100 sec. | 1–10 |
| 3,5-diaminobenzoic Acid | " | 1–7 |
| m-hydroxyaniline | " | 0–10 |
| m-phenylenediamine | " | 0–2, 6–10 |
| p-phenylenediamine | " | 6–12 |
| 1,2,4-triaminobenzene | " | 2–12 |
| 1,3,5-triaminobenzene | " | 1–12 |
| 1,3-diamino-4-methoxybenzene | " | Greater than 9 |
| 1,3-diamino-4-nitrobenzene | " | Less than 3 |
| 1,4-diamino-2-nitrobenzene | Less than 10 min. | 4–5 |
| 2,4-diaminotoluene | Less than 100 sec. | 6–10 |
| o-hydroxyaniline | Approx. 10 min. | Greater than 9.5 |
| m-methoxyaniline | Less than 100 sec. | Less than 5 |
| o-phenylenediamine | " | Approx. 7.5 |
| 2,4-diaminodiphenylamine | " | 5–9 |

EXAMPLE 2

A mixture of 100 grams of high solids phenol-formaldehyde prepolymer prepared as described in Example 1 and 0.305 moles of 4-aminosalicylic acid were refluxed for 2.25 hours, cooled, and 26.3 grams methanol stirred into the mixture. A 10 gram aliquot of the amine-modified resin was weighed out, 0.5 grams concentrated hydrochloric acid added to adjust the pH, and 5.0 grams of a curing agent added. The curing agent comprised a solution of 55% formaldehyde in methanol and water, thickened with a small quantity of refined chrysotile asbestos (96.4% formaldehyde solution and 3.6% asbestos.) The adhesive composition was used in a standard cross-lap test (see Marra, A., "Geometry as an Independent Variable in Adhesive Joint Studies," Forest Products Journal, Vol. XII, No. 2, pp. 81-90, 1962.)

The cross-lap test is conducted by spreading the adhesive composition on the central area of a piece of Douglas fir wood 1 inch wide by approximately ¾ inch thick and 2¾ inches long. A similar piece of Douglas fir wood is immediately laid over the first with the grain direction at right angles. A measured quantity of adhesive may be used or an excess may be applied with the surplus resin allowed to squeeze out of the joint. The latter method has been used for the examples given here. As soon as the cross-lap is laid on the first piece, a pressure of 40 pounds is applied for the desired length of time. The joint is then broken in tension and the bond strength recorded. At the end of 12 minutes press time the tensile strength necessary to separate the cross-lap of this example was 159 lbs. per sq. in.

the end of 12 minutes press time the tensile strength necessary to separate the cross-lap was 282 lbs. per sq. in.

EXAMPLE 4

A resin was made using the molar ratios of ingredients of Example 1 with m-hydroxyaniline as the amine. A 4-liter reactor was charged with 1913.3 grams of 91.5% phenol, 457.2 grams of 94.7% paraformaldehyde, 58.8 grams of water and 19.2 grams of calcium acetate monohydrate. Heat and agitation were applied and the temperature raised to reflux (about 109°C.) in 60 minutes. It was held at reflux for 2 hours to form an aldehyde condensation polymer having reactive alkylol groups, then cooled slightly to 101°C. and 808.4 grams of m-hydroxyaniline added. The temperature dropped to 80°C. but was again raised to reflux in 15 minutes and held for 3 hours. At that time the temperature was 104°C. The reaction product was cooled to 60°C. and 186.0 grams of methanol added and thoroughly mixed in. The resin was then cooled to 25°C. and removed to storage. The final viscosity was W on the Gardner series.

To 10 parts of the above resin was added 0.5 parts of concentrated hydrochloric acid to bring pH into a more optimum range and 5 parts of the thickened aldehyde curing agent of Example 2. These ingredients were rapidly mixed together and used in a cross-lap test. At 2 minutes press time a tensile strength of 105 psi was obtained. Tensile strength rose to 230 psi after 4 minutes press time. The gel time of the adhesive composition was 20 seconds.

EXAMPLE 5

A resin was made using essentially the molar ratios of ingredients of Example 4 except that m-phenylenediamine was used in place of m-hydroxyaniline. A 4-liter reactor was charged with 2213.2 grams of 88.8% phenol, 518.8 grams of 93.5% flake paraformaldehyde and 21.6 grams of calcium acetate monohydrate. The resin was cooked in identical fashion to that of Example 4 up to the point of addition of amine. At this time 914.4 grams of m-phenylenediamine was added and cooked as before except that the time was shortened to 2½ hours. After cooling to 60°C. 718.7 grams of methanol was stirred in and the product cooled further to 25°C. Finally 219.3 grams of concentrated (38%) hydrochloric acid was added and thoroughly mixed.

A cross-lap test was made using an adhesive comprising 10 parts of the above resin and 5 parts of the thickened aldehyde curing agent of Example 2. Tensile strength values of 50 psi were noted after 4 minutes press time. Crross-lap strength increased to 70 psi after 12 minutes press time. The gel time of the adhesive composition was 12 seconds.

EXAMPLE 6

A mixture of 100 grams of the phenol-formaldehyde polymer, prepared as described in Example 1, and 0.305 moles of 2,4-diaminotoluene were refluxed in a reaction vessel for 2.25 hours, cooled, and 26.3 grams of methanol stirred into the mixture. This resin was used as the adhesive in a cross-lap test by taking 10 grams of the resin and 5 grams of the asbestos-thickened aldehyde curing agent of Example 2, mixing rapidly and spreading on a cross-lap joint. After 12 minutes press time a joint strength of 70 psi had been reached. The gel time of the adhesive composition was 20 seconds.

EXAMPLE 7

A mixture of 100 grams of the phenol-formaldehyde polymer prepared as described in Example 1 and 0.305 moles of m-xylylenediamine were refluxed in a reactor for 2.5 hours, cooled and 26.3 grams of methanol mixed into the product. In a cross-lap test 10 grams of this resin were mixed with 1.2 grams of concentrated hydrochloric acid and 5 grams of the asbestos-thickened aldehyde curing agent of Example 2. After 12 minutes press time the cross-lap had developed a tensile strength of 45 psi. Gel time of the adhesive was 10 seconds.

EXAMPLE 8

Two parts by weight of 2,4-diaminoacetanilide was dissolved with gentle heating in one part of N,N-dimethylformamide. To the reactor containing the amine solution were added with agitation and gentle warming 6 parts by weight of a urea-formaldehyde resin (Amres 255, a product of Pacific Resins and Chemicals Co.). Amres 255 is typical of many general purpose liquid urea-formaldehyde adhesive resins readily available on the market. It is made with an approximate 2 to 1 mole ratio of formaldehyde to urea, is cooked to a Gardner viscosity of U at a pH of 8.0, and contains 65% resin solids in a water solution. A discussion of preparation of resins of this type is made in "Aminoplasts" by C. P. Vale and published by Cleaver-Hume Press, Ltd., London, England, and especially to pages 12-46.

Five parts by weight of the amine-modified resin was mixed with 0.45 parts of concentrated hydrochloric acid and 2.5 parts of the asbestos-thickened aldehyde curing agent of example 2. The mixture was stirred rapidly and used in the cross-lap test. At the end of the 12 minute press time the tensile strength necessary to separate the cross-lap was 230 lbs. per sq. in. The gel time of the adhesive composition was 120 seconds.

EXAMPLE 9

Ten grams of 2,4-diaminoacetanilide was charged to a reaction vessel and 20 grams of N,N-dimethylformamide was added with stirring. To this mixture was added 30 grams of a melamine-urea-formaldehyde resin (Melurac 400, a product of American Cyanamid Co.). Melurac 400 is a solid spray dried adhesive resin typical of many similar products commercially available which are intended for hot press or radio frequency bonding of wood products. Resins of this type are described on page 201 of the Vale reference mentioned earlier and are also described in British Pat. No. 480,316.

The mixture was heated to 60°C. and a slow addition begun of 12.5 grams of a 55% solution of formaldehyde in methanol and water. An exothermic reaction took place that increased the temperature to 74°C. After a short period of additional mixing the resin was cooled to 25°C.

The above resin was tested in the standard cross-lap by taking a 10 gram sample of the resin, adding 0.3 gram of HCl for pH adjustment and 5 grams of the thickened solution of formaldehyde in methanol of Example 2. The cross-laps developed a tensile strength of 55 psi after pressing 8 minutes and 155 psi after pressing 12 minutes. The gel time of the adhesive composition was 90 seconds.

EXAMPLE 10

Twenty grams of m-xylylenediamine was charged to a reaction vessel and 20 grams of N,N-dimethylformamide was added with stirring. When a uniform mixture was obtained 6 grams of Melurac 400 resin was added with gentle heating. After all evidence of reaction had ceased the product was cooled and withdrawn to storage. A cross-lap was made using as the adhesive a mixture of 10 grams of above resin, 1.5 grams of concentrated hydrochloric acid and 5 grams of the asbestos-thickened aldehyde curing agent of Example 2. After 12 minutes press time the joint had developed a tensile strength of 135 psi. Gel time of the adhesive was 30 seconds.

EXAMPLE 11

A 4-liter reactor was charged with 2468.9 grams of 90.4% phenol, 120.3 grams of water and 1226.8 grams of flake paraformaldehyde. The temperature was adjusted to 25°C. and 34.0 grams of 49.5% NaOH was added. Heating was begun with agitation and the temperature was raised at a uniform rate to 85°C. in 82 minutes. Above 60°C. intermittent cooling was required to control the exotherm. Heating was continued under reflux conditions for an additional 5 hours until a Gardner viscosity of about $Z_1$ had been reached, whereupon the resin was cooled to 25°C. The molar ratio of formaldehyde to phenol in this resin was 1.6 to 1.

A second 4-liter reactor was charged with 1075.6 grams of m-hydroxyaniline and 273.7 grams of methanol. Heating and agitation was applied and the temperature brought to reflux at about 84°C. and held until a smooth slurry was formed. This slurry was then cooled to 70°C. and 1662.2 grams of the above phenolic resole was added slowly over a 10-minute period. The mixture was again heated to reflux at about 95°C. and held approximately 30 minutes until all the m-hydroxyaniline had dissolved. The reaction mixture was now cooled to 60°C. and 254.1 grams of concentrated HCl added. The temperature was held at 65°C. for 15 minutes, then 234.5 grams of a 55% solution of formaldehyde in methanol was slowly added so as to maintain the temperature between 65° and 75°C. After completion of this addition the resin was heated to reflux for 15 minutes, cooled to 25°C. and removed to storage.

Ten parts of the above resin was mixed with 5 parts of the asbestos-thickened curing agent of Example 2 and used in a cross-lap test on Douglas fir. After only 1 minute under pressure the tensile strength of the cross-lap was 85 psi. In 2 minutes a value of 290 psi was recorded and in 4 minutes the value was 405 psi. The gel time of the adhesive composition was 30 seconds.

EXAMPLE 12

An acetone-formaldehyde resin was prepared by charging 17,746 grams of 50% formalin, 1270 grams water and 4173 grams of acetone into a 5-gallon reactor. Temperature of the mixture was adjusted to 40°C., and 45.4 grams of 49.5% sodium hydroxide added with agitation. The mix was further cooled to 30°C. and a second 45.4 gram portion of 49.5% sodium hydroxide added. The temperature was then allowed to rise uniformly to 65°C. over the next hour using cooling as required to control the exotherm. After reaching the maximum temperature the mixture was held at 65°–70°C. for an additional 20 minutes until the exotherm had completely subsided. The acetone-formaldehyde resin was then cooled to room temperature and removed to storage.

An amine-modified acetone-formaldehyde resin was prepared by charging 1777.6 grams of m-hydroxyaniline and 890.0 grams of methanol into a 4-liter reactor. Heating and agitation were now begun and the temperature was brought to reflux (about 75°C.) and held until all of the amine had dissolved. The amine solution was cooled to 60°C. and addition of 1332.4 grams of the above acetone-formaldehyde resin was begun. This was added in small increments in order to control the highly exothermic reaction which occured. Temperature was controlled between 60°C. and 70°C. until all of the acetone-aldehyde resin had been added and the exothermic reaction subsided. At this time the temperature was raised to reflux (about 80°C.) and held for 30 minutes after which it was cooled to room temperature and removed to storage. The final viscosity was A, on the Gardner scale.

Cross-lap tests were made by rapidly mixing 10 parts of the above amine-modified resin, 0.5 parts of concentrated HCl and 5 parts of the thickened aldehyde curing agent of Example 2. After only 2 minutes press time a tensile strength of 80 psi was measured. After 4 minutes press time the tensile strength was 235 psi. The gel time of the adhesive composition was 30 seconds.

EXAMPLE 13

This experiment indicates that it is preferred that the condensation type polymer should be prepared first and the amine added, rather than adding the components simultaneously in order to obtain a polymer useful for the purposes desired.

To a reactor was added the following: 945.8 grams, 90% phenol, 396 grams m-hydroxyaniline, 12.2 grams water and 9.6 grams calcium acetate monohydrate. The mixture was heated to 30°C. and 223.8 grams paraformaldehyde slowly added to avoid an excessive exothermic reaction. The temperature rose to about 85°C. After all the paraformaldehyde had been added the mixture was heated to reflux (about 105°C.). The mixture was then cooled. A gelled solid formed on cooling which could not be dissolved and could not be used. Analysis indicated a large excess of unreacted phenol.

EXAMPLE 14

This experiment shows that epoxides are effectively used as curing agents for the resin compositions of this invention. A mixture was made of 42.5 grams of the resin of Example 4, a m-hydroxyaniline modified phenol-formaldehyde novolac, with 23.4 grams of an epoxidized phenol-formaldehyde novolac having an average of 2.2 epoxy groups per molecule (Dow Chemical Co. epoxy resin DEN 431). The resulting mixture had a 30°C. gel time of 39 minutes.

To show that any amino groups of the Example 4 resin are not acting in a conventional manner to simply homopolymerize the epoxy resin the following experiments were made. The amount of m-hydroxyaniline and phenol-formaldehyde novolac present in the above Example 4 resin were held separately, before any reaction together, and each was mixed with 23.4 grams of the above epoxy resin using 7.9 grams of methanol as a solvent carrier to insure compatibility. When 29.8 grams of the phenol-formaldehyde prepolymer alone in methanol was mixed with the epoxy a gel time greater than 2 weeks was measured. Mixing 10.8 grams of m-hydroxyaniline in methanol with the epoxy resulted in a composition having a 30°C. gel time of 355 minutes, nearly ten times that of the Example 4 resin. No additional aldehyde was present in any of the three tests.

EXAMPLE 15

Isocyanates also function as effective curing agents for the resins of this invention as is shown by this example. To the resins of Example 4, made with m-hydroxyaniline and of Example 5, made with m-phenylenediamine was added 2,4-toluene diisocyanate using a molar equivalence of —NCO groups to the —NH$_2$ groups of the amine used in the resin. Thus to 10 grams of the resin of Example 4 were added 1.65 grams of TDI. To 10 grams of the Example 5 resin 3.31 grams of TDI were added. The mixture was vigorously stirred immediately after addition of the hardener and the time to gelation noted visually. Additional experiments were made in which the pH of both resins was adjusted from the ambient nearly neutral or very slightly alkaline level to values of pH 6 and pH 4, using concentrated HCl, before addition of the isocyanate. Gel times as follows were obtained.

|  | Example 4 Resin | Example 5 Resin |
| --- | --- | --- |
| Ambient pH | 6.8 seconds | 3 seconds |
| pH 6.0 | 7.1 seconds | 11 seconds |
| pH 4.0 | 150 seconds | 10 seconds |

EXAMPLE 16

This example shows the suitability of substituted phenols for making the aldehyde condensation polymers of this invention. Three polymers were made and designated A, B, and C in which the phenol of Example 1 was replaced by ortho, meta or para-cresol, respectively. These polymers were then used in the preparation of m-hydroxyaniline resins according to the teachings of Example 4.

The polymers were prepared by adding 244.6 grams of the cresol, 23.7 grams of water, 56.4 grams of 93.2% paraformaldehyde and 2.35 grams of calcium acetate to a reaction vessel. The temperature was raised to reflux over 60 minutes and held until free formaldehyde had dropped below 0.5% based on samples withdrawn from the reactor. Time at reflux for the ortho-cresol exceeded 23 hours before the free formaldehyde had dropped to the desired level. Cooking time after reflux was only 20 minutes for meta-cresol and 3 hours for para-cresol. At this time, the temperature was reduced slightly to 100°C. and 98.2 grams of m-hydroxyaniline added. The temperature was allowed to increase again to the reflux point and the resin was reacted for an additional 2½ hours. A marked viscosity increase occurred near the end of this cooking period on the B and C resins although this was not observed on the A resin. The resins were then cooled to 50°C. and 77.7 grams of methanol added. After cooling to room temperature 17.25 grams of concentrated HCl was added to the resins to bring pH into the desired range. Finally 11.6 grams of refined crysolite asbestos was added and mixed in for 30 minutes for penetration control.

Ten gram samples of the resin were mixed with 5 grams of 55% formaldehyde in a methanol-water solvent and cross lap and gel tests run. Results are shown below:

|  | Resin A | Resin B | Resin C |
| --- | --- | --- | --- |
| Viscosity, Gardner* | Al-A | U-V | E-F |
| pH | 3.7 | 4.6 | 4.0 |
| Gel Time, sec. | 55 | 40 | 70-75 |
| Cross Lap Strength, psi. | 85 | 65 | 10 |

*Before addition of HCl, asbestos or hardener.

EXAMPLE 17

The aldehyde condensation polymers used in this invention can suitably be made with lower polyfunctional aldehydes such as glyoxal. As an example 202.5 grams of 90.5% phenol, 109.2 grams of 40% glyoxal and 5.0 grams of calcium hydroxide were placed in a 500 ml. reactor. The temperature was raised to reflux over a 60 minute period and held at reflux for 5 hours until titration of a sample showed essentially no free glyoxal. At this point the temperature was dropped to 80°C. and 84.4 grams of m-hydroxyaniline added. The temperature was again raised to reflux and held for 2½ hours. Temperature of the resin was dropped to 50°C. at which time 66.8 grams of methanol, 9.9 grams of refined crysolite asbestos and 14.8 grams of concentrated hydrochloric acid were added. Mixing was continued for an additional half hour at this temperature after which the resin was cooled and drawn to storage.

A 10 gram sample of the above resin was mixed with 5 grams of 55% formaldehyde in a methanol-water solution and the gel time and cross lap strength determined. The mixed composition gelled in 30–35 seconds. A 12-minute cross lap strength using Douglas-fir of 10 psi was measured.

EXAMPLE 18

Polyfunctional aldehydes are also suitable as curing agents for amine modified condensation resins. A resin very similar to that of Example 4 was mixed with 40% aqueous glyoxal in the ratio of 30 grams of resin to 15 grams glyoxal solution. A gel time of 55 seconds was measured. The cross lap test using Douglas fir wood showed a glue line strength of 200 psi after 12 minutes.

What is claimed is:

1. A method of bonding two members one to the other comprising
   1. applying to at least one of said members a rapid curing, liquid adhesive composition comprising
      a. the reaction product of an aldehyde condensation polymer containing reactive alkylol groups with a primary aromatic amine of the formula

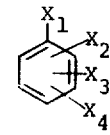

wherein $X_1$ is $-NH_2$ or $-CH_2NH_2$; $X_2$ is $-NH_2$, $-CH_2NH_2$ or $-OH$; $X_3$ is $-NH_2$, $-CH_2NH_2$, $-NO_2$, $-OH$, alkyl of 1 to 5 carbon atoms, hydrogen, halogen, halogenated alkyl, alkyoxy or

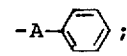

$X_4$ is hydrogen, alkyl of 1 to 4 carbon atoms or aryl; and A is $-SO_2-$, $-NH-$, $-O-$, $-S-$, $-C=C-$, $-S-S-$, $-N=N-$ or

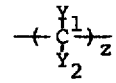

where $Y_1$ and $Y_2$ are hydrogen or alkyl of 1 to 3 carbon atoms and z is 0, 1 or 2, the amount of said amine being at least 0.05 part by weight per part of said aldehyde condensation polymer; said aldehyde condensation polymer being selected from the group consisting of phenoplasts, aminoplasts, and ketone-aldehyde condensation polymers prepared from a monofunctional aldehyde or a polyfunctional aldehyde having at least two aldehyde groups separated by no more than one carbon atom; and
      b. a curing agent reactable with said reaction product at ambient temperatures, the amounts of said reaction product and curing agent being sufficient to cause said composition to rapidly become insoluble and infusible at ambient temperatures;
   2. assembling said members with said liquid adhesive composition therebetween; and
   3. maintaining the members so positioned until curing of said composition has occurred.
2. The method of claim 1 wherein said amine is m-hydroxyaniline, a phenylenediamine, a triaminobenzene, a diaminotoluene or a xylylenediamine.
3. The method of claim 1 wherein said amine is m-hydroxyaniline.
4. The method of claim 1 wherein said amine is a phenylenediamine.

5. The method of claim 1 wherein said curing agent comprises an alkylene donating compound, a diisocyanate, a polyisocyanate or an epoxide.

6. The method of claim 1 wherein said curing agent comprises an alkylene donating compound.

7. The method of claim 1 wherein said curing agent comprises formaldehyde.

8. The method of claim 1 wherein the amount of curing agent is from 0.02 to 2.0 parts by weight per part by weight of said reaction product.

9. The composition of claim 1 wherein the amount of said amine is from 0.1 to 1.0 part by weight per part of said aldehyde condensation polymer.

10. The method of claim 1 wherein said aldehyde condensation polymer is a phenoplast.

11. The method of claim 10 wherein said amine is m-hydroxyaniline.

12. The method of claim 1 wherein said aldehyde condensation polymer is a phenol-formaldehyde resin.

13. The method of claim 12 wherein said amine is m-hydroxyaniline.

14. The method of claim 1 wherein said aldehyde condensation polymer is an aminoplast.

15. The method of claim 14 wherein said amine is m-hydroxyaniline.

16. The method of claim 1 wherein said aldehyde condensation polymer is a urea-formaldehyde resin.

17. The method of claim 16 wherein said amine is m-hydroxyaniline.

18. The method of claim 1 wherein said aldehyde condensation polymer is a melamine-urea-formaldehyde resin.

19. The method of claim 18 wherein said amine is m-hydroxyaniline.

20. The method of claim 18 wherein said aldehyde condensation polymer is a ketone-aldehyde condensation polymer.

21. The method of claim 18 wherein said amine is m-hydroxyaniline.

22. The method of claim 1 wherein said aldehyde condensation polymer is an acetone-formaldehyde resin.

23. The method of claim 22 wherein said amine is m-hydroxyaniline.

24. The method of claim 1 wherein said aldehyde condensation polymer is selected from the group consisting of formaldehyde condensed with phenol, xylenol, cresol, phenol-resorcinol, or resorcinol.

25. The method of claim 24 wherein said amine is m-hydroxyaniline, a phenylenediamine, a triaminobenzene, a diaminotoluene or a xylylenediamine.

26. The method of claim 24 wherein said amine is m-hydroxyaniline.

27. The method of claim 1 wherein said members consist of wood.

* * * * *